United States Patent

Ishibashi

[11] Patent Number: 5,214,337
[45] Date of Patent: May 25, 1993

[54] ELECTROMAGNETIC ROTARY ACTUATOR
[75] Inventor: Takehisa Ishibashi, Kanagawa, Japan
[73] Assignee: Atsugi Unisia Corp., Japan
[21] Appl. No.: 731,251
[22] Filed: Jul. 17, 1991
[30] Foreign Application Priority Data
   Jul. 19, 1990 [JP] Japan .......................... 2-77254[U]
[51] Int. Cl.⁵ ............................................. H02K 1/22
[52] U.S. Cl. ........................................ 310/268; 310/90; 384/121
[58] Field of Search ................ 310/268, 90, 181, 254, 310/261, 264; 384/121, 124, 215, 223

[56] References Cited

U.S. PATENT DOCUMENTS

| 3,786,289 | 1/1974 | Baclawski et al. | 310/90 |
| 4,340,830 | 7/1982 | Hoyer-Ellesen | 310/89 |
| 4,776,437 | 10/1988 | Ishibashi et al. | 188/299 |
| 4,873,461 | 10/1989 | Brennan et al. | 310/47 |
| 4,874,976 | 10/1989 | Ohsawa et al. | 310/268 |
| 5,008,572 | 4/1991 | Marshall et al. | 310/45 |

FOREIGN PATENT DOCUMENTS

| 0329471 | 8/1989 | European Pat. Off. | 310/268 |
| 3344249A1 | 4/1985 | Fed. Rep. of Germany | 310/268 |
| 1207482 | 12/1985 | Fed. Rep. of Germany | 310/268 |
| 1-210636 | 8/1989 | Japan | 310/268 |
| 1455704 | 11/1976 | United Kingdom | 310/268 |
| 1576956 | 10/1980 | United Kingdom | 310/268 |
| 2062356 | 5/1981 | United Kingdom | 310/268 |
| 2150258 | 6/1985 | United Kingdom | 310/268 |
| 2162376 | 1/1986 | United Kingdom | 310/268 |
| 2173049 | 10/1986 | United Kingdom | 310/268 |

Primary Examiner—Steven L. Stephan
Assistant Examiner—Matthew Nguyen
Attorney, Agent, or Firm—Ronald P. Kananen

[57] ABSTRACT

An electromagnetic rotary actuator includes a rotor and a stator with two bearings. The rotor, including a plurality of permament magnets, is arranged between an annular disk of non-permament magnetic material including a plurality of coils on cores and another annular disk of magnetic material. The rotor includes a central hub arranged between the tow bearings. The actuator includes a resilient washer positioned between one of the bearings and the central hub for eliminating a thrust clearance between the central hub and the other bearing.

3 Claims, 5 Drawing Sheets

ELECTROMAGNETIC ROTARY ACTUATOR

BACKGROUND OF THE INVENTION

The present invention relates to an electromagnetic rotary actuator, and more particularly to such a rotary actuator for use as an actuator for turning a control rod of a hydraulic damper of the variable damping force type.

EP 0 329 471, which was published on Aug. 23, 1989, discloses a rotary actuator of the above kind. This known actuator comprises a rotor including a support disk of non-magnetic material, rotatable with a shaft normal to its plane, and provided at its periphery with inserts distributed in circular symmetry. These inserts are made from permanent magnetic material and magnetized in a parallel relationship to the shaft in alternately opposite directions. A stator includes a cylindrical casing of non-magnetic material having a first end wall and a second end wall. The internal face of the first end wall of the casing is covered with a first annular disk of non-permanent magnetic material carrying coils distributed in circular symmetry. The internal face of the second end wall of the casing is covered with a second annular disk of magnetic material. The support disk includes a central hub arranged between the first and second annular disks and rotatably supported by a first bearing and a second bearing which are arranged adjacent said first and second walls, respectively. This actuator is not satisfactory in that an appreciable mechanical noise is produced when the rotor is attracted by the coils upon supply of alternate electric pulses.

An object of the present invention is to improve the rotary actuator such that the production of such mechanical noise is eliminated.

SUMMARY OF THE INVENTION

According to the present invention, there is provided an electromagnetic rotary actuator comprising a rotor including a support disk of non-magnetic material, rotatable with a shaft normal to its plane, and provided at its periphery with inserts distributed in circular symmetry, said inserts being made from permanent magnetic material and magnetized in a parallel relationship to said shaft in alternately opposite directions; a stator including a cylindrical casing of non-magnetic material having a first end wall and a second end wall, the internal face of said first end wall of said casing being covered with a first annular disk of non-permanent magnetic material carrying coils distributed in circular symmetry, the internal face of said second end wall of said casing being covered with a second annular disk of magnetic material, said rotor being arranged between said first and second annular disks and rotatably supported by a first bearing and a second bearing which are arranged adjacent said first and second walls, respectively; and means for resiliently biasing said rotor toward said first bearing and eliminating a clearance between said rotor and said first bearing.

DETAILED DESCRIPTION OF THE INVENTION

Figure 1:
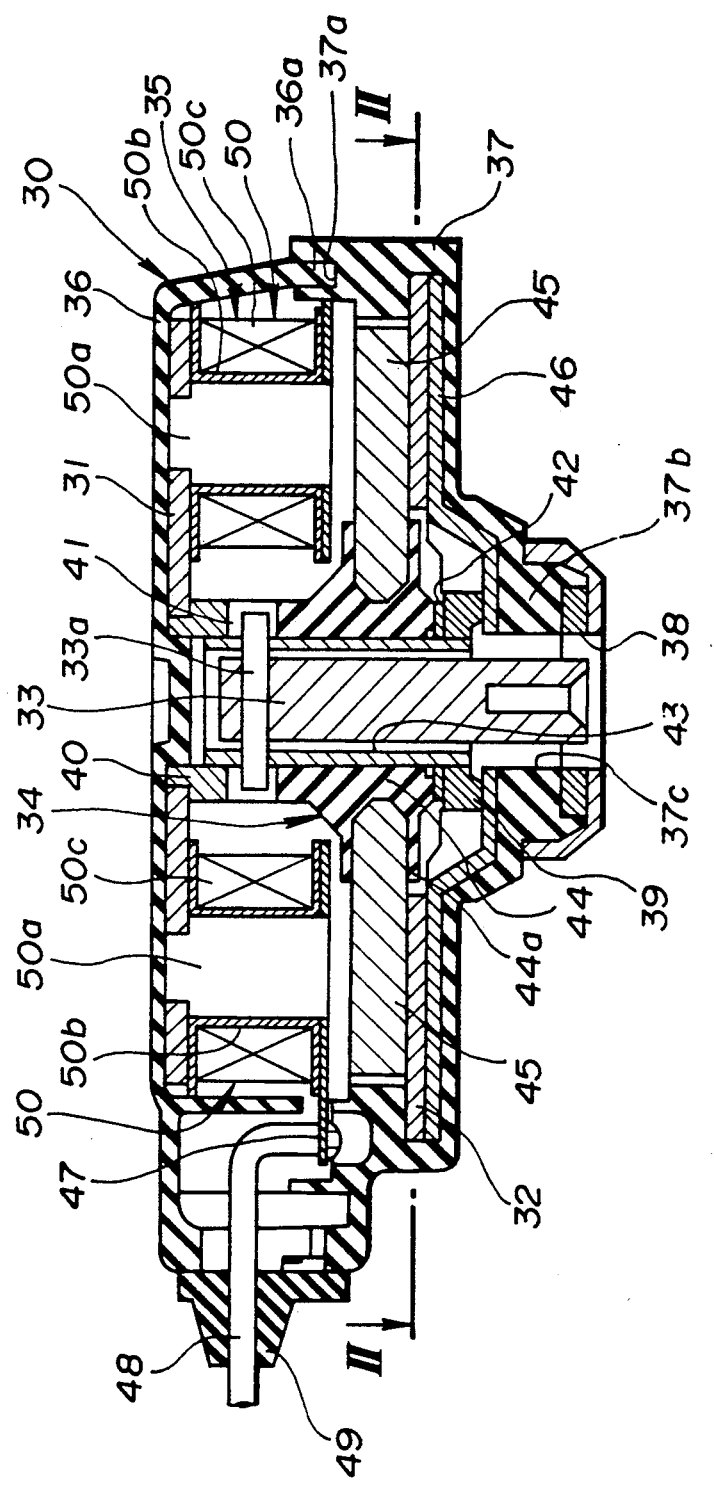
FIG. 1 is an axial sectional view of a first embodiment of electromagnetic rotary actuator according to the present invention.
Figure 2:
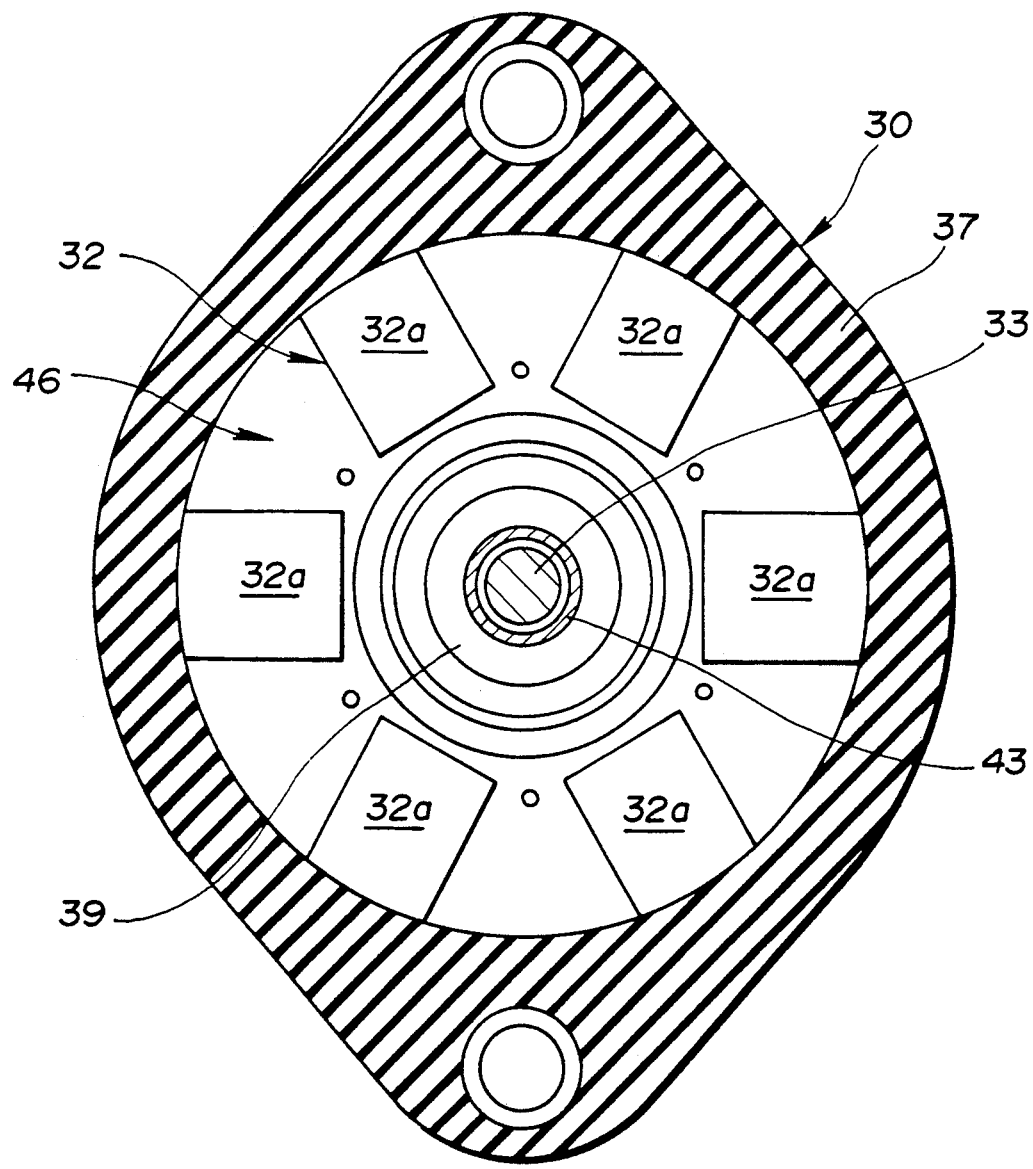
FIG. 2 is a radial sectional view taken through the line II—II of FIG. 1.

The electromagnetic rotary actuator shown in FIGS. 1 and 2 includes essentially a stator 30 and a rotor 34. The rotor 34 is simply constituted by a support disk 44a made from molded synthetic resin or other non-magnetic material. The support disk 44a comprises a central hub 44 rotatable with an output shaft 33 normal to the plane of support disk 44a. The central hub 44 is fitted on a guide sleeve 43 whose ends rotate in an upper bearing 40 and a lower bearing 39 which are carried by the stator 30. The output shaft 33 is received in the guide sleeve 43 and locked thereto by a cotter pin 33a.

Figure 4:
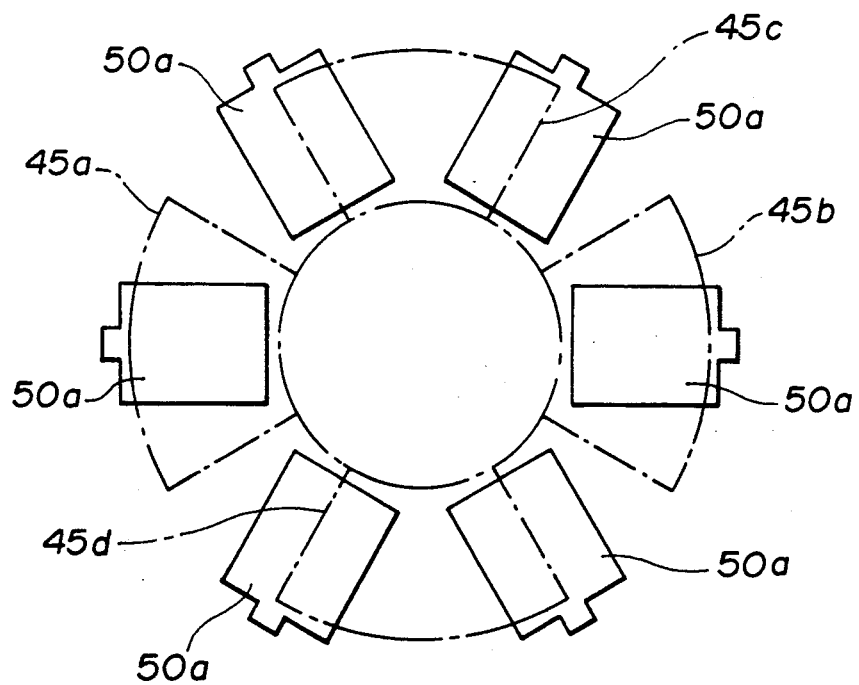

The support disk 44a of the rotor 34 is provided with four radial grooves distributed in circular symmetry and each of which is filled up by an insert designated generally by a reference numeral 45 in FIG. 1 but designated by different reference numerals 45a, 45b, 45c and 45d in FIG. 4. Each of the inserts 45a, 45b, 45c and 45d is in the shape of a trapezium, the large and small bases of which are curvilinear. The inserts 45a, 45b, 45c and 45d, which are moulded integral with the support disk 44a or secured thereto by way of stiking or welding, are made from a permanent magnetic material, possessing an anisotropic structure whose preferential axis is normal to the plane of the support disk 44a, and are magnetized in that direction in alternately opposite senses.

Figure 3:
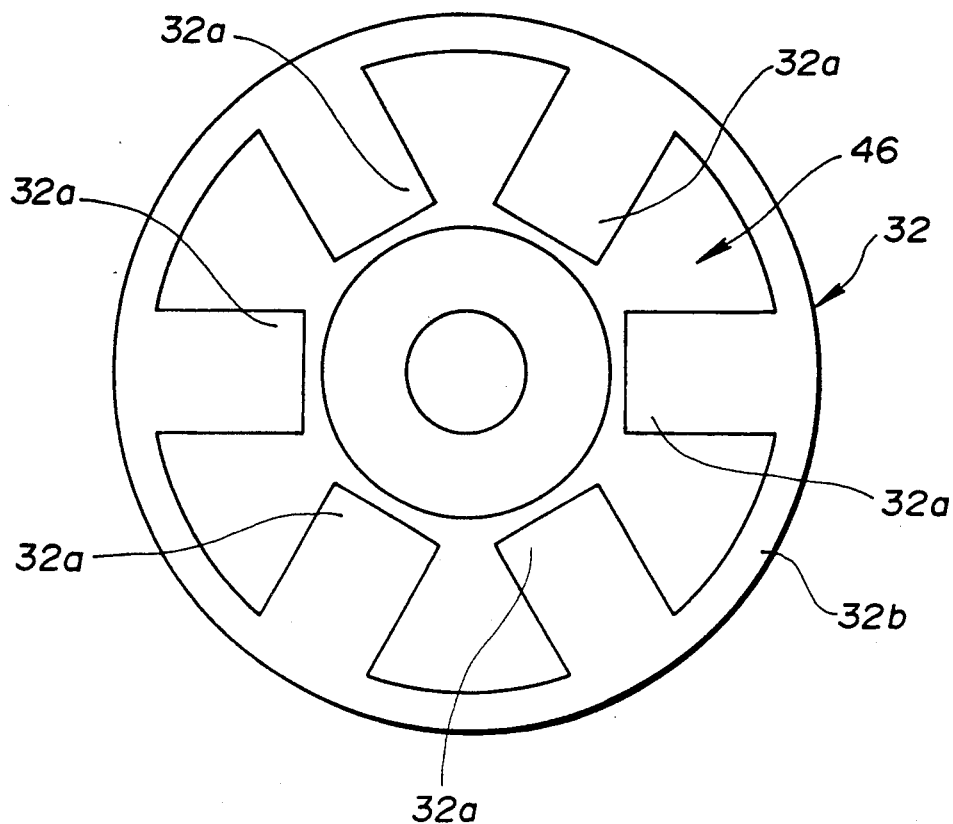
FIGS. 3 and 4 are radial sectional diagrams illustrating the relationship between radial arms, cores and inserts of a rotor.

The stator 30 is essentially constituted by a cylindrical casing formed of two cup-shaped parts 36, 37 made from synthetic resin or other non-magnetic material, arranged on either side of the rotor 34 and the peripheries of which are fitted into one another. The cup-shaped part 37 or lower cup includes a central annular boss 37b with a bore 37c in which the output shaft 33 is disposed and fixedly carries the second or lower bearing 39 on the upper end of the central annular boss 37b and an annular seal 38 recessed into the central boss 37b. The cup-shaped part 36 or upper cup includes a central boss and carries the upper bearing 40. On the internal face of an end wall of the cup-shaped part 36 is arranged an annular disk 31 of non-permanent magnetic material 31 which carries six coils 50c, each of which encircles a bobbin 50b fitted on a core 50a of magnetic material. As shown in FIG. 4, the six cores 50a are distributed in circular symmetry and form a part of an electromagnetic assembly generally designated by reference numeral 50. On the internal face of an end wall of the cup-shaped part 37 is arranged an annular disk 46 of magnetic material. On the second annular disk 46 is arranged a ring 32 of magnetic material. As best seen in FIG. 3, the ring 32 includes an annular belt 32b defining the outer periphery and six radial arms 32a distributed in circular symmetry. The outer peripherires of the annular disk 46 and ring 32 are received into a groove of the cup-shaped part 37. The six cores 50a and the six arms 32a are distributed in circular symmetry and in mutually corresponding relationship on either side of the rotor 34.

Figure 5:
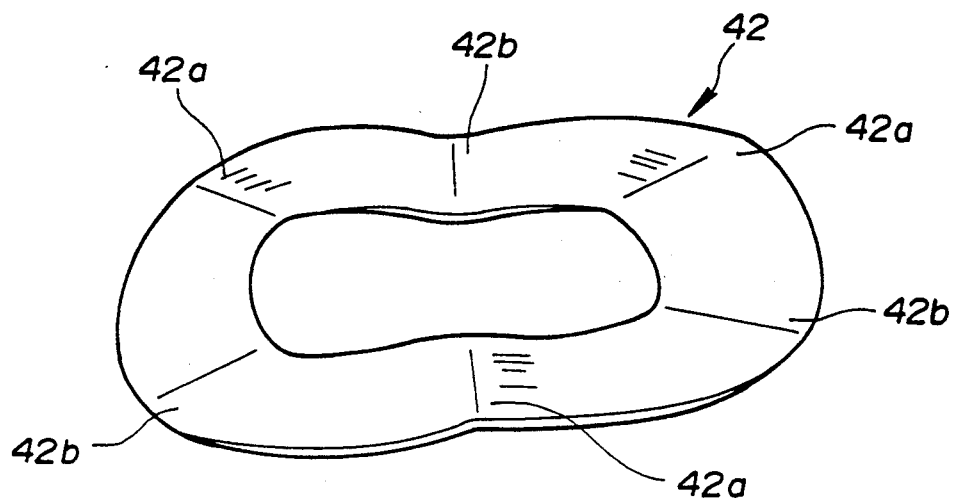
FIG. 5 is a perspective view of a resilient washer.

From the preceding description, it is now appreciated that the rotor 34 is arranged between the annular disks 31 and 46 and rotatably supported by the upper bearing 40 arranged adjacent the end wall of the cup-shaped part 36 and the lower bearing 39 arranged adjacent the end wall of the cup-shaped part 37. As best seen in FIG. 1, the central hub 44 is arranged between the upper and lower bearings 40 and 39, and has one or upper axial end opposing to the bearing 40 and an opposite or lower axial end opposing to the bearing 39. Disposed between the bearing 40 and the adjacent end of the central hub 44 is a washer 41. Disposed between the bearing 39 and the adjacent end of the central hub 44 is a resilient washer 42. As best seen in FIG. 5, the resilient washer 42 is made of springy material and in the shape of an annulus undulated to form three wave heads 42a and three wave bottoms 42b which are alternate and distributed in circular symmetry. The resilient washer 42 biases the central hub 44 toward the upper bearing 40. With this arrangement, a thrust clearance between the upper bearing 40 and the adjacent end of the central hub 44 is eliminated. The reaction by the resilient washer 42 is opposed to and larger than the total of weight of the rotor 34 and a force with which the rotor 34 attracts the second disk 46 and the ring 32 thereon. Thus, the first bearing 40 is always kept in contact with the adjacent end of the central hub 44.

Figure 6:
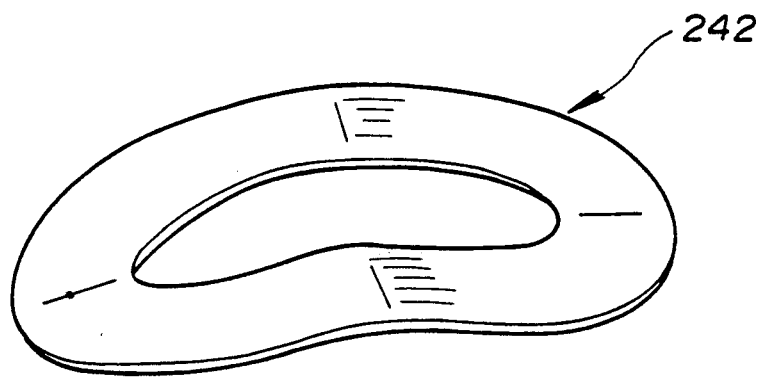
FIG. 6 is another form of a resilient washer.

FIG. 6 shows another form of a resilent washer 242. Similar to the shape shown in FIG. 5, the resilient washer 242 is made of springy material and in the shape of an annulus undulated to form two wave heads and two wave bottoms which are distributed in circular symmetry.

The coils 50c are supplied with alternate polarity electric pulses via a printing board 47 and a harness 48 connected to the printing board 47 and extends outwardly through a grommet 49.

When the coils 50c are supplied with alternate polarity electric pulses, the interaction between the magnetic fields which they generate and those produced by the permanent magnets 45a, 45b, 45c and 45d of the rotor 34 ensures stepped progression of the latter. Upon supply of alternate polarity electric pulses, the rotor 34 is attracted by the coils 50c and thus the central hub 44 of the rotor 34 is urged to come into firm contact with the first bearing 40. Since, as discussed before, there exists no thust clearance owing to the provision of the resilient washer 42, no appreciable noise is produced upon supply of alternate polarity electric pulses.

When there is no supply of electric alternate polarity electric pulses, the permanent magnets 45a, 45b, 45c and 45d rest on the radial arms 32a since the force with which the magnets 45a, 45b, 45c and 45d attract the annular disk 46 is larger than the force with which the former attract the cores 50a. This results from the fact that the area of a surface of the annular disk 46 opposing to the permanent magnets 45a, 45b, 45c and 45d of the rotor 34 is wider than the total area of surfaces of the cores 50a opposing to the permanent magnets of the rotor.

Figure 7:
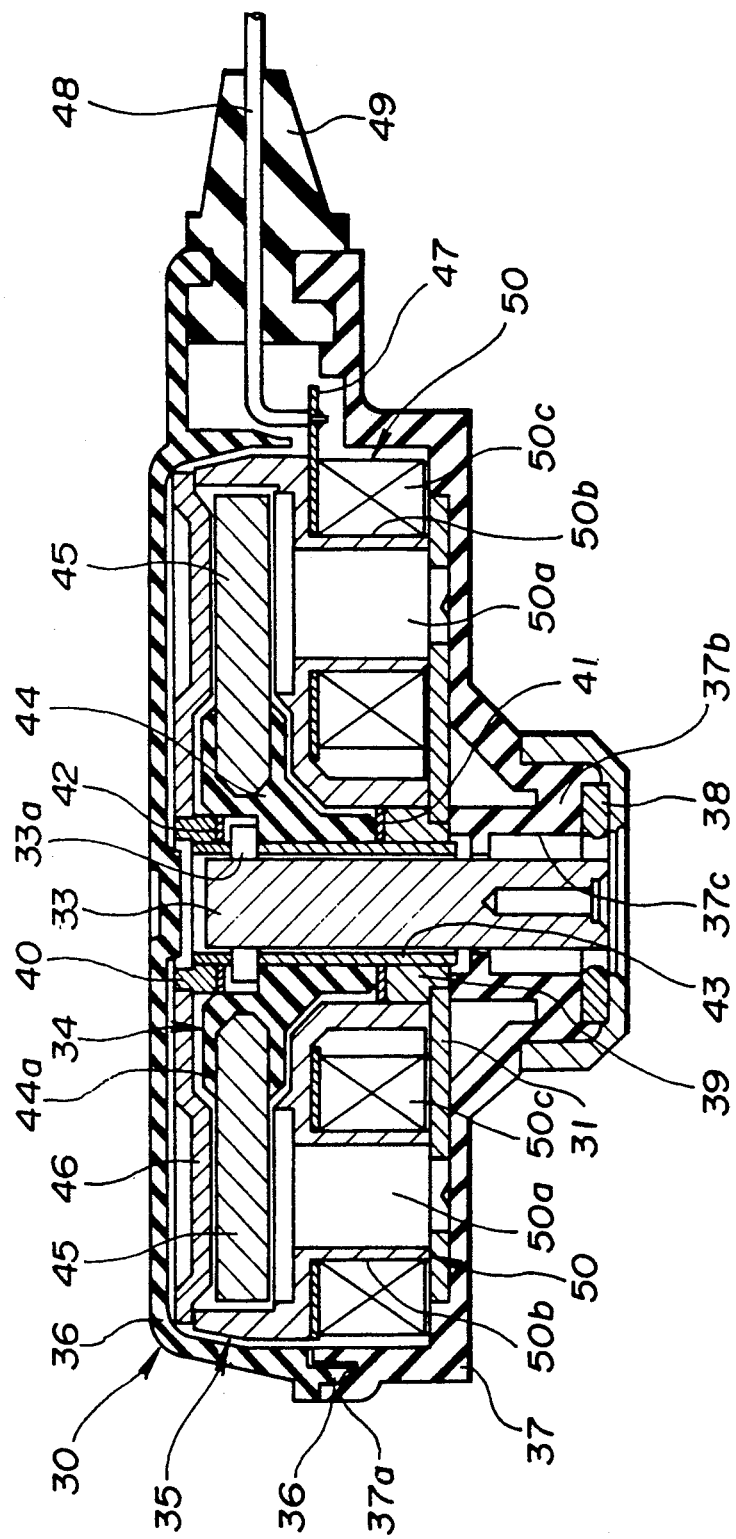
FIG. 7 is a view similar to FIG. 1 illustrating a second embodiment of electromagnetic rotary actuator.

In the second embodiment of the rotary actuator according to the present invention illustrated in FIG. 7. This embodiment is substantially the same as the first embodiment except that it is arranged upside down. The arrangement between a stator 30 and a rotor 34 is modified such that the rotor 34 is arranged upside down between the annular disks 31 and 46. As different from the first embodiment, the annular disk 31 including coils 50c is arranged on a lower cup-shaped part 37, while the annular disk 46 is arranged on an upper cup-shaped part 36. In this embodiment, a washer 41 is disposed between a lower bearing 39 and the adjacent axial end of a central hub 44 and a resilent washer 42 is disposed between an upper bearing 40 and the adjacent axial end of the central hub 44. The resilient washer 42 is selected such that its reaction force overcomes the resultant force derived from subtracting a force due to weight of the rotor 34 from a force with which permanent magnets 45 attract the annular disk 46.

What is claimed is:

1. An electromagnetic rotary actuator comprising a rotor including a support disk of non-magnetic material, rotatable with a shaft normal to its plane and provided at its periphery with inserts distributed in circular symmetry, said inserts being made from permanent magnetic material and magnetized in a parallel relationship to said shaft in alternately opposite directions; a stator including a cylindrical casing of non-magnetic material having a first end wall and a second end wall, the internal face of said first end wall of said casing being covered with a first annular disk of non-permanent magnetic material carrying coils distributed in circular symmetry, the internal face of said second end wall of said casing being covered with a second annular disk of magnetic material, said support disk being arranged between said first and second annular disks and rotatably supported by a first bearing and a second bearing which are arranged adjacent said first and second end walls, respectively, of said casing; and means for acting on said second bearing and also on said support disk to separate said support disk from said second bearing and urge said support disk against said first bearing so as to eliminate a clearance between said support disk and said first bearing.

2. An electromagnetic rotary actuator comprising:
  a rotor including a support disk of non-magnetic material, rotatable with a shaft normal to its plane and provided at its periphery with inserts distributed in circular symmetry, said inserts being made from permanent magnetic material and magnetized in a parallel relationship to said shaft in alternately opposite directions;
  a stator including a cylindrical casing of non-magnetic material having a first end wall and a second end wall;
  a first bearing arranged adjacent said first end wall;
  a second bearing spaced from said first bearing and arranged adjacent said second end wall;
  the internal face of said first end wall of said casing being covered with a first annular disk of non-permanent magnetic material carrying coils distributed in circular symmetry, the internal face of said second end wall of said casing being covered with a second annular disk of magnetic material,
  said support disk being arranged between said first and second annular disks and rotatably supported by said first bearing and said second bearing, said support disk includes a central hub disposed between said first and second bearings and having one end opposing to said first bearing and an opposite end opposing to said second bearing; and
  a resilient washer disposed between said opposite end of said central hub and said second bearing and acting on said second bearing and also on said support disk to separate said support disk from said second bearing and urge said support disk against said first bearing so as to eliminate a clearance between said support disk and said first bearing.

3. An electromagnetic rotary actuator as claimed in claim 2, wherein said resilient washer is made of springy material and in the shape of an annulus undulated to form wave heads and wave bottoms which are distrubuted in circular symmetry.

* * * * *